US011913360B2

(12) United States Patent
Moser et al.

(10) Patent No.: US 11,913,360 B2
(45) Date of Patent: Feb. 27, 2024

(54) METHOD FOR OPERATING A POWER PLANT IN ORDER TO GENERATE ELECTRICAL ENERGY BY COMBUSTION OF A CARBONACEOUS COMBUSTIBLE, AND CORRESPONDING SYSTEM FOR OPERATING A POWER PLANT

(71) Applicant: RWE POWER AKTIENGESELLSCHAFT, Essen (DE)

(72) Inventors: Peter Moser, Cologne (DE); Georg Wiechers, Hilden (DE); Sandra Schmidt, Wuppertal (DE); Knut Stahl, Hamm (DE)

(73) Assignee: RWE Power Aktiengesellschaft, Essen (DE)

( * ) Notice: Subject to any disclaimer, the term of this patent is extended or adjusted under 35 U.S.C. 154(b) by 0 days.

(21) Appl. No.: 17/278,776

(22) PCT Filed: Jun. 18, 2019

(86) PCT No.: PCT/EP2019/066097
§ 371 (c)(1),
(2) Date: Mar. 23, 2021

(87) PCT Pub. No.: WO2020/064156
PCT Pub. Date: Apr. 2, 2020

(65) Prior Publication Data

US 2021/0363899 A1 Nov. 25, 2021

(30) Foreign Application Priority Data

Sep. 24, 2018 (DE) ..................... 10 2018 123 417.1

(51) Int. Cl.
*F01K 23/10* (2006.01)
*F01K 13/00* (2006.01)
*F01K 25/10* (2006.01)

(52) U.S. Cl.
CPC ............ *F01K 23/10* (2013.01); *F01K 13/006* (2013.01); *F01K 25/103* (2013.01); *F05D 2220/76* (2013.01); *F05D 2260/61* (2013.01)

(58) Field of Classification Search
CPC ...... F01K 13/00; F01K 13/006; F01K 23/064; F01K 23/10; F01K 25/103; F05D 2220/76; F05D 2260/61; Y02E 20/32
See application file for complete search history.

(56) References Cited

U.S. PATENT DOCUMENTS 9,249,690 B2 * 2/2016 Karni ........................ F02C 3/34
10,830,108 B2 * 11/2020 Löytty ...................... F01N 5/02
(Continued)

FOREIGN PATENT DOCUMENTS

DE 1190256 4/1965
DE 4304124 3/1994
(Continued)

OTHER PUBLICATIONS

Patent Cooperation Treaty (PCT)—Application No. PCT/EP2019/066097—International Preliminary Report on Patentability—dated Mar. 23, 2021.

*Primary Examiner* — Jesse S Bogue
(74) *Attorney, Agent, or Firm* — LOTT & FISCHER, PL

(57) ABSTRACT

The invention relates to a method for operating a power plant (1) for generating electrical energy for delivery to at least one consumer (16) by combustion of a carbonaceous combustible, wherein carbon dioxide (19) is separated from the flue gas (7) of the power plant (1), the separated carbon dioxide (19) is converted at least in part into a fuel (20), characterized in that the fuel (20) is combusted at least
(Continued)

temporarily in at least one heat engine (4) so as to form a waste gas (8), and electrical energy is generated by the heat engine (4) and is delivered to at least one consumer (16), at least some of the thermal energy of the waste gas (8) being used in at least one of the following processes: a) for heating combustion air (10) of a power plant (1); b) for heating a process medium (14) of the power plant (1); c) in a drying of the combustible of the power plant (1); and d) in carbon dioxide separation.

8 Claims, 5 Drawing Sheets

(56) References Cited

U.S. PATENT DOCUMENTS

| | | | | |
|---|---|---|---|---|
| 2007/0084209 | A1* | 4/2007 | Nigro | F01K 23/10 60/39.182 |
| 2014/0083109 | A1* | 3/2014 | Oelfke | F02C 1/005 60/39.5 |
| 2014/0373551 | A1* | 12/2014 | Kraft | F01K 23/02 60/772 |
| 2015/0007579 | A1* | 1/2015 | Curran | F01K 23/10 60/39.182 |
| 2015/0184853 | A1* | 7/2015 | Malavasi | F23L 7/002 110/342 |
| 2016/0237858 | A1* | 8/2016 | Bergins | F01K 3/188 |
| 2016/0319702 | A1* | 11/2016 | Martindale | F01K 7/165 |
| 2019/0226374 | A1* | 7/2019 | Mathai | F01N 3/106 |

FOREIGN PATENT DOCUMENTS

| | | |
|---|---|---|
| DE | 102006034712 | 1/2008 |
| DE | 102010010540 | 9/2011 |
| DE | 102011013922 | 9/2012 |

* cited by examiner

METHOD FOR OPERATING A POWER PLANT IN ORDER TO GENERATE ELECTRICAL ENERGY BY COMBUSTION OF A CARBONACEOUS COMBUSTIBLE, AND CORRESPONDING SYSTEM FOR OPERATING A POWER PLANT

This application is a national phase of PCT Application No. PCT/EP2019/066097 filed Jun. 18, 2019, which in turn claims the priority to German Patent Application No. 10 2018 123 417.1 filed Sep. 24, 2018.

The present invention relates to a method for operating a power plant for generating electrical energy for delivery to at least one consumer by combustion of a carbonaceous combustible combined with carbon dioxide separation, and a corresponding system for operating such a power plant.

Power plants for generating electrical energy by combustion of carbonaceous fuels have been known for a long time. It is assumed that the resulting carbon dioxide ($CO_2$) has a notable impact on the observed warming of the earth's atmosphere. In order to reduce the emission of carbon dioxide from fossil-fuel power plants, efforts are being made in many countries to at least partly replace fossil energy, i.e., energy that is generated by combusting fossil fuels such as coal, crude oil or natural gas, with regenerative energies, for example from wind energy installations and photovoltaic installations, from converting biomass into electricity and/or from the use of hydropower. However, these energies are highly fluctuating and dependent on environmental conditions that can only be influenced to a limited extent. At the same time, grid stability in the power grid is of crucial importance since changes in grid frequency due to fluctuations in power generation can lead to failures and sometimes considerable damage. This is particularly problematic when there are load peaks and/or sudden reductions in the electrical energy fed into the corresponding power grid. In many countries this has led to the decision to continue to generate at least part of the required energy from fossil fuels for at least a certain period of time.

In order to reduce the emission of the resulting carbon dioxide, separating carbon dioxide from the flue gas of a fossil-fuel power plant and either storing or reusing the carbon dioxide generated is known. For example, it is known from DE 10 2010 010 540 A to combine a steam turbine power plant fueled by lignite with gas scrubbing in order to separate carbon dioxide and to operate the gas scrubbing and drying of the lignite such that some of the waste heat from the gas scrubbing and/or drying is used to preheat combustion air and/or steam boiler feed water. Despite the increase in efficiency described in this document, there is still a need to improve the overall efficiency of a fossil-fuel power plant combined with subsequent carbon dioxide separation in order to further reduce the amount of carbon dioxide released into the atmosphere.

Proceeding from this, the present invention addresses the problem of at least partly overcoming the disadvantages known from the prior art and, in particular, of improving the overall efficiency of a power plant combined with downstream carbon dioxide separation.

These problems are addressed by the independent claims. Dependent claims are directed to advantageous developments. It should be noted that the features listed individually in the dependent claims can be combined with one another in any technologically meaningful manner and define further embodiments of the invention.

In addition, the features specified in the claims are described and explained in more detail in the description, further preferred embodiments of the invention being thereby shown.

The method according to the invention for operating a power plant for generating electrical energy for delivery to at least one consumer by combustion of carbonaceous combustible, carbon dioxide being separated from the flue gas of the power plant, the separated carbon dioxide being converted at least in part into a fuel, is characterized in that the fuel is combusted at least temporarily in at least one heat engine so as to form a waste gas, electrical energy being generated by the heat engine and being delivered to at least one consumer, at least some of the thermal energy of the waste gas being used in at least one of the following processes:

a) for heating combustion air of a power plant;
b) for heating a process medium of the power plant;
c) in drying of the combustible of the power plant; and
d) in carbon dioxide separation.

A carbonaceous fuel is preferably understood to mean fossil fuels such as coal, in particular lignite or hard coal, crude oil and/or natural gas, and also biomass and residues such as tar, refuse and/or production waste. The design of a heat engine for generating electrical energy makes it possible, in particular, to increase the current output of the system consisting of the power plant and the heat engine during load peaks. A heat engine can be started up quickly and the amount of electricity it delivers can be controlled over a wide range, which does not apply, or applies only to a limited extent, to conventional fossil-fuel power plants. This makes it possible to react quickly in the event of load peaks and/or when the energy, in particular from renewable energy sources, fed into a power grid collapses in order to ensure grid stability.

At the same time, the creation of warm waste gas in the heat engine makes flexible use of the thermal energy contained therein possible in order to further increase the efficiency of the overall system consisting of the power plant, carbon dioxide separation, fuel synthesis and optionally other components such as fuel processing or fuel drying.

Heating the combustion air of a power plant is understood in particular to mean that the combustion air used in a combustion appliance of the power plant, for example a pulverized coal furnace, is heated up before it flows into the combustion appliance. Heating can take place in an air preheater which is operated, for example, by flue gas of the power plant and to which waste gas from the heat engine is now at least temporarily supplied such that the temperature and/or the volume flow of the mixture of flue gas and waste gas can be increased.

Heating the process medium of the power plant is understood to mean, in particular, that water is heated in order to generate steam by means of the combustion appliance of the power plant and after flowing through the combustion appliance, for example, is supplied as pressurized steam to at least one turbine where the pressure is released while simultaneously generating electricity.

The use in drying the combustible of the power plant is understood to mean that the waste heat of the waste gas of the heat engine is used in drying the combustible. This is particularly advantageous when considering a coal-fired power plant since lignite in particular has to dry before it can be converted into electricity. In particular in the case of pulverized coal-fired power plants, drying can also include grinding. Even when converting biomass into electricity, it is advantageously possible to dry the biomass at least partly using the waste heat of the heat engine before it is supplied to the combustion appliance.

The use in carbon dioxide separation is understood in particular to mean that the waste heat is used as a heat source in such a carbon dioxide separation process. In particular in a cyclic absorption-desorption process, the waste heat can at least partly supply energy to heat a solvent stream such that the input of other energy, for example via hot steam, can be reduced.

The measures mentioned each lead to a reduction in the energy that has to be supplied from other sources. This increases the overall efficiency of the overall system.

In a preferred embodiment, the waste gas is supplied to the flue gas of the power plant.

Flue gas and at least part of the waste gas are thus mixed. Since at least some of its waste heat is regularly removed from the flue gas in order to increase efficiency, an increase in the efficiency of the overall system can be achieved in a simple manner since the temperature of the mixture can be adjusted by adding the waste gas, preferably the temperature of the mixture can be increased, and the waste gas can be used thermally in existing apparatuses such as heat exchangers. The waste gas is added to the flue gas preferably after some of the waste heat of the waste gas has already been used for at least one of the processes a) to d).

In this context, it is preferred that the waste gas is supplied to the flue gas before said waste gas is supplied to at least one of the following processes:

i) heating the combustion air of the power plant;
ii) heating at least one process medium of the power plant; and
iii) carbon dioxide separation.

In principle, the process medium preferably comprises water and/or steam. Steam and water are regularly heated in the circuit as a process medium by means of the combustion appliance of the power plant in order to drive at least one turbine for generating electricity by the pressurized steam generated, as a result of which the pressure of the steam is released and, optionally, at least partly condensed into water which is then heated and evaporated again. By carrying out carbon dioxide separation in order to separate the carbon dioxide from the flue gas and the waste gas, a carbon dioxide cycle can be achieved since the carbon dioxide from the waste gas which is produced by the combustion of the fuel generated from the separated carbon dioxide can be separated again.

By adding at least some of the waste gas to the flue gas before the combustion air and/or process medium is heated, the efficiency of the corresponding process and thus the overall efficiency of the power plant can be increased.

In a preferred embodiment, at least one of the following heat engines is formed:

an internal combustion engine,
a diesel engine;
a gas engine; and
a gas turbine.

A diesel engine, in particular, has proven to be particularly efficient since it can be operated with high efficiency and the fuels dimethyl ether or methanol or mixtures comprising dimethyl ether and methanol, which are preferably synthesized from carbon dioxide, can be burned directly in it. In particular, the fuels methane and methanol can advantageously be burned in a gas engine, in particular a gas-Otto engine or a gas-diesel engine. In addition to a diesel engine, an Otto engine or a Stirling engine can also preferably be used as the internal combustion engine.

In a preferred method, the fuel comprises at least one of the following substances:

methanol ($CH_4O$);
methane ($CH_4$); and
dimethyl ether (DME, $C_2H_6O$).

Methanol and methane can be used as raw materials for the synthesis of other fuels. Both methanol and methane can be burned directly in heat engines. DME is particularly preferred since DME is also available as a raw material for the synthesis of other substances and also burns practically soot-free. In comparison with a power plant without the heat engine according to the invention, the procedure described here leads to an increase in overall efficiency and a reduction in carbon dioxide emissions and emissions of nitrogen oxides ($NO_x$) and soot. DME is preferably obtained via a catalytic conversion of carbon dioxide with (electrolytically generated) hydrogen.

In a preferred embodiment, the at least one consumer of the electrical energy is connected to the power plant via a power grid.

Supplying a power grid in which a plurality of electrical consumers are usually at least partly connected to the power plant for their power supply is a preferred application of the present invention. During operation, the heat engine also feeds the generated electrical energy at least partly into the power grid.

In a preferred method, the heat engine is operated based on the electrical load in the power grid.

In particular, this allows the heat engine to be switched on when a nominal output of the power plant is exceeded, i.e., a higher electrical output would have to be fed into the power grid than the power plant can nominally output, i.e., a peak load situation is present. A pure (binary) switching-on of the heat engine can take place here, but it can be operated based on the electrical load in the power grid, the heat engine outputting power at least in part based on the requested load in the power grid. The heat engine is therefore preferably operated in such a way that the electrical power it delivers is defined on the basis of the electrical load in the power grid.

In a preferred procedure of the method, the conversion of the carbon dioxide into fuel is operated based on the electrical load in the power grid.

In this way, some of the power provided by the power plant can be used for the synthesis of the fuel when the load is below a nominal power of the power plant.

This allows the power plant to be operated by the generation of the fuel and the operation of the heat engine being used to store and release energy.

Furthermore, a system for operating a power plant, in particular according to the method according to the invention, is proposed, comprising the power plant,
a carbon dioxide separator,
a synthesis installation for the synthesis of a fuel from carbon dioxide, characterized in that a heat engine is formed, by means of which the fuel can be combusted while generating electrical energy and waste gas, the heat engine being thermally connectable at least temporarily to at least one of the following elements in order to transmit at least some of the waste heat of the waste gas:

A) an air preheater for heating combustion air of a power plant;
B) a process medium preheater for heating a process medium, such as water and/or steam, of the power plant;

C) a drying installation for drying the combustible of the power plant; and

D) the carbon dioxide separator.

The system preferably further comprises at least one mixer for mixing waste gas (of the heat engine) and a flue gas of the power plant.

The details and advantages disclosed for the method according to the invention can be transferred and applied to the system according to the invention and vice versa.

The method according to the invention and the system according to the invention make it possible to significantly increase the overall efficiency of the system in comparison with conventionally operated power plants combined with carbon dioxide separation or in comparison with synthesis installations for the synthesis of a fuel from carbon dioxide from other sources, for example from the air.

The invention and the technical environment will be explained in more detail with reference to the figures. It should be noted that the invention should not be limited by the embodiments shown. In particular, unless explicitly stated otherwise, it is also possible to extract partial aspects from the facts explained in the figures and to combine them with other components and/or insights from other figures and/or from the present description. In the drawings, shown schematically:

Figure 1:
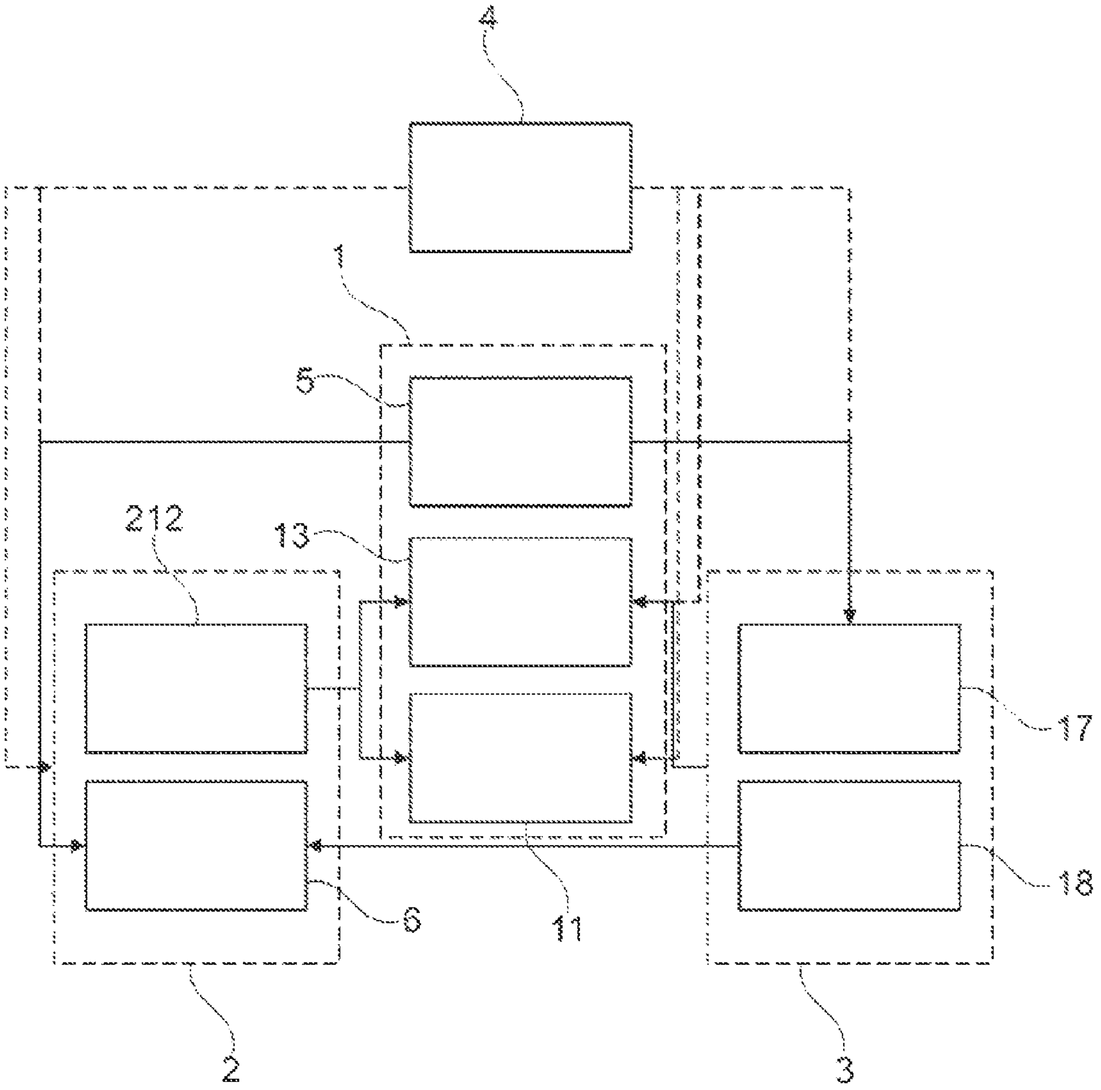
FIG. 1 shows a system consisting of a power plant combined with carbon dioxide separation and a heat engine.

In the following, the same elements are provided with the same reference signs. FIG. 1 schematically shows a power plant 1. In this power plant 1, a carbonaceous fuel is combusted, thereby generating steam, which in turn is used to generate electrical energy by releasing pressure via at least one turbine. The resulting flue gas of the power plant 1 contains carbon dioxide. The power plant 1 is preferably a fossil-fuel power plant in which fossil fuels such as coal, in particular lignite or hard coal, crude oil and/or gas are combusted, and/or a power plant for combusting biomass. In this case, the configuration as a dry lignite power plant is preferred. The scheme shown in FIG. 1 does not relate to the design of the power plant 1 as such, which is known, rather FIG. 1 shows the thermal interaction of certain elements of the power plant 1 and other elements. In addition to the power station 1, the overall system has a carbon dioxide separator 2 and a drying installation 3. The system shown also includes a heat engine 4.

Various processes are known for separating carbon dioxide, for example a typical carbon dioxide separation method is based on what is known as amine scrubbing, in which the gas containing carbon dioxide (i.e., the flue gas of power plant 1) is replaced by an alkaline aqueous solution of amines, e.g., of monoethanolamine (MEA), diethanolamine (DEA), methyldiethanolamine (MDEA), piperazine (PZ), aminomethylpropanol (AMP) and/or diglycolamine (DGA), and the carbon dioxide is separated from the gas by alternating absorption and desorption processes.

Figure 2:
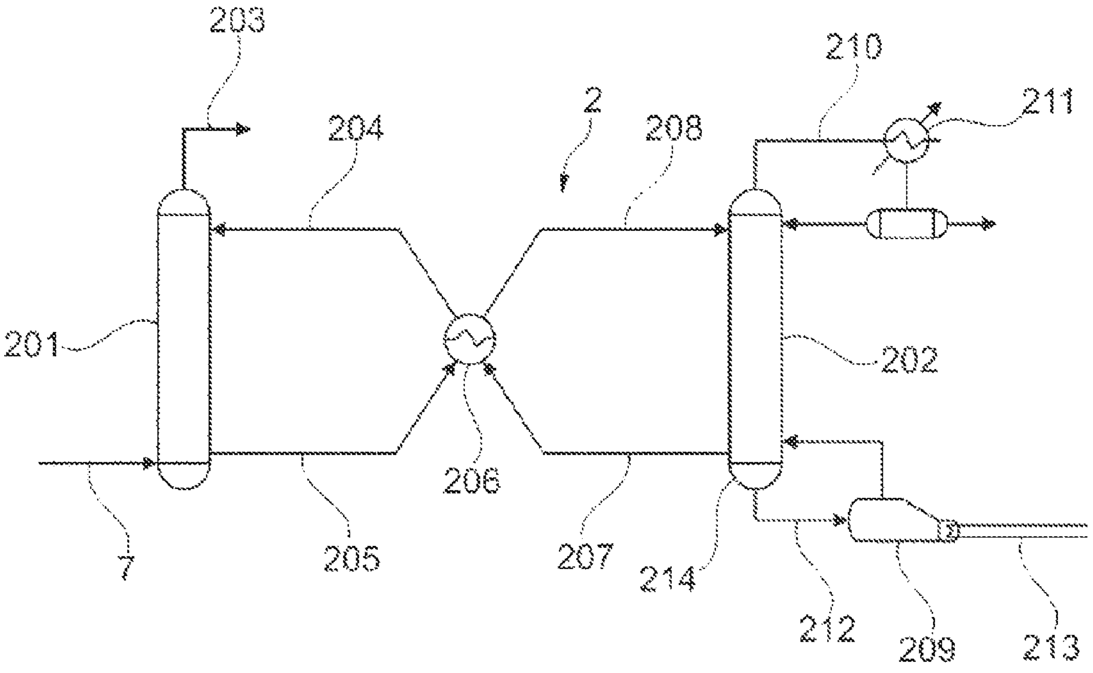
FIG. 2 shows an example of a carbon dioxide separator as part of a system for operating a power plant.

An example of a carbon dioxide separator 2 is shown schematically in FIG. 2; this corresponds to the prior art. The carbon dioxide separation system 2 comprises an absorber 201 and a desorber 202. Flue gas 7 of the power plant 1 flows through the absorber 201. The waste gas 203, which substantially consists of nitrogen, leaves the absorber 201; the carbon dioxide is dissolved in a solvent, an aqueous solution of at least one amine, in the absorber 201. For this purpose, the absorber 201 is coated with a first solvent inflow 204; a first solvent outflow 205 is discharged from the absorber 201. The first solvent inflow 204 is low in carbon dioxide, while the first solvent outflow 205 is rich in carbon dioxide. The first solvent inflow 204 is supplied to the absorber 201 at a comparatively low temperature of approximately 40-60° C.

The first solvent outflow 205 is conducted to a heat exchanger 206 which is designed as a countercurrent heat exchanger. The first solvent outflow 205 is heated in the heat exchanger 206 by a heat exchange with a second solvent outflow 207. This second solvent outflow 207 then leaves the desorber 202. The second solvent outflow 207 is likewise low in carbon dioxide, but is at a significantly higher temperature level than the first solvent inflow 204 when flowing into the absorber 201. As a result, the second solvent outflow 207 heats the second solvent outflow 205, which after heating is supplied to the desorber 202 as a second solvent inflow 208, via the heat exchanger 206. In the desorber 202, hot steam (desorber vapors 212) which is generated from solvent in a reboiler 209 flows against the solvent flow. For this purpose, a partial flow of the solvent which is drawn off in the desorber bottom 214 of the desorber 202 is heated by steam 213, here low-pressure steam. At the higher temperatures of the solvent, the solvent releases the carbon dioxide again, this is drawn off as carbon dioxide flow 210 at the top in the desorber 202 and then cooled by a cooler 211 and supplied for further use.

Figure 3:
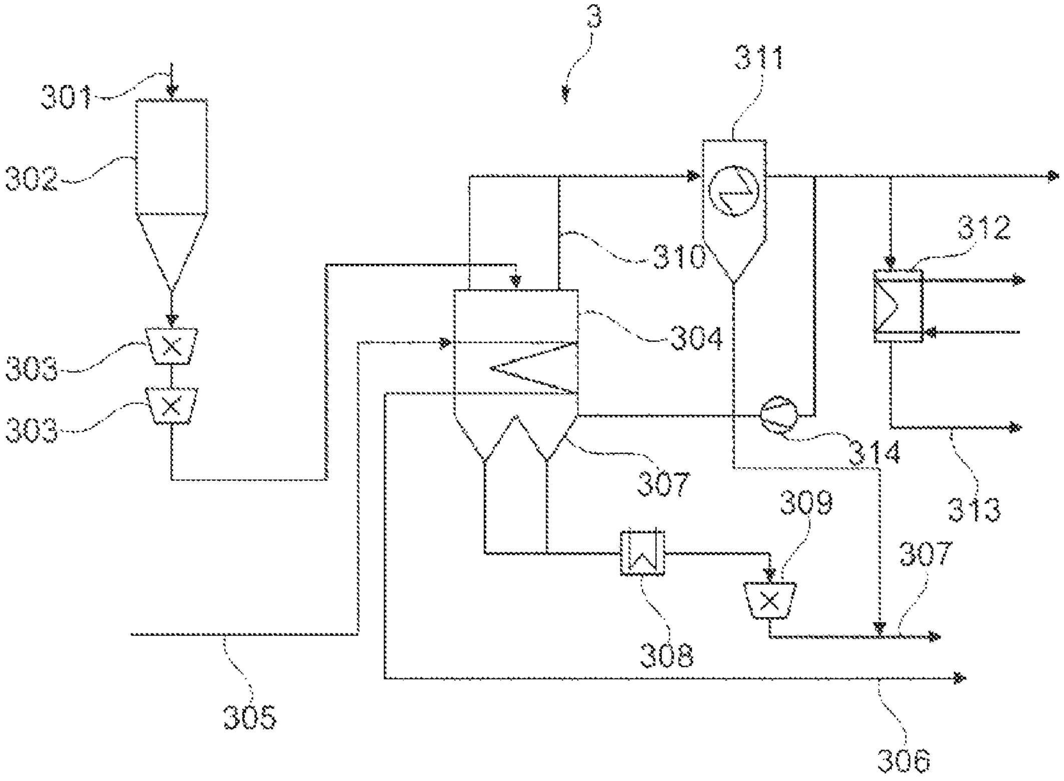
FIG. 3 shows an example of a drying installation as an optional element of a system for operating a power plant.

FIG. 3 shows an example of conventional drying for lignite in a drying plant 3. Here, crude lignite 301 is supplied to a crude lignite bunker 302 and from this, as required, supplied to a dryer 304 via various mills 303. The dryer 304 is heated by means of steam 305 which gives off its heat to the lignite, which is to be dried and is finely ground in the mills 303, and leaves the dryer 304 again as condensate 306. The dried lignite, also referred to as dry lignite 307, is discharged from the dryer 304 via a cooler 308. After any subsequent grinding in a mill 309, the dry lignite 307 produced in this way can be supplied for further use, for example for combustion in a power plant 1.

The vapors 310 produced in the dryer 304 are cleaned in a filter 311 to remove the pulverized lignite contained therein; this pulverized lignite is also added to the dry lignite 307. After filtering, the vapors 310 are condensed in a vapor condenser 312 through which, for example, a process medium (boiler feed water) or combustion air flows and are heated as a result. The resulting vapor condensate 313 is discharged. The vapor 310 can optionally be compressed by means of a vapor compressor 314.

Referring again to FIG. 1, the power plant 1 has, viewed from a thermal perspective, heat sources, i.e., process regions which provide heat or from which heat, which can be used in other processes, is to be removed. In addition to the flue gas, which is not shown in FIG. 1, this is, for example, a turbine 5 (see FIG. 1) by means of which a generator (not shown) is driven to generate electricity. The turbine 5, in particular in modern power plants 1, is often a combination of a high-pressure turbine in which the steam generated is initially released from a high pressure level to a medium pressure level, and at least one additional turbine connected thereto, for example a low-pressure turbine, in which the steam is released from a medium pressure level to a low pressure level or a combination of a medium-pressure and a low-pressure turbine.

A generator for generating electricity is driven by each of the turbines. The steam present when it leaves the turbine 5 is comparatively warm, in particular has temperatures of from 100° C. [degrees Celsius] to 300° C. It is supplied to heat sinks, i.e., used in endothermic process steps, i.e., to process steps which require the supply of thermal energy, which the supplied steam delivers, in order to be carried out. This is necessary, for example, as part of the carbon dioxide separation 2 in the washing agent regeneration 6. Alternatively or additionally, the steam can be supplied to a drying installation 3. Another heat source in the system is, for example, the desorber vapors 212 of the carbon dioxide separator 2 (see description of FIG. 2 above) which can be supplied to heat sinks in the power plant 1, for example to a process medium preheater 13, by means of which a process medium such as the feed water of the boiler of the power plant 1 can be preheated, to a condensate preheater or to a preheater of the steam supplied to a high-pressure or low-pressure turbine. Alternatively or additionally, the desorber vapors 212 can be used to preheat the combustion air of the power plant 1 by the desorber vapors 212 being supplied to an air preheater 11.

Further heat sources are, for example, the vapors 310 of the drying installation 3, depending on the use of a vapor compressor 314, as non-compressed vapor 17 or as compressed vapor 18. The corresponding vapors 310 can serve as a heat source, for example, for preheating the feed water of the boiler of the power plant 1, preheating condensate or preheating the steam supplied to a high-pressure or low-pressure turbine. Alternatively or additionally, the vapors 310 can be used to preheat the combustion air of the power plant 1.

According to the present invention, the system also has at least one heat engine 4 which can increase the electrical power output of the power plant 1 in times of increased load. This is an internal combustion engine, a diesel engine, a gas engine and/or a gas turbine. This heat engine 4 is operated by a fuel which is generated from the carbon dioxide which is separated in the carbon dioxide separator 2 and then converted into a fuel, for example into DME.

The combustion of the fuel produces a waste gas 8 which is also a heat source, at least some of the thermal energy of the waste gas 8 being used in at least one of the processes a) to d) described.

Figure 4:
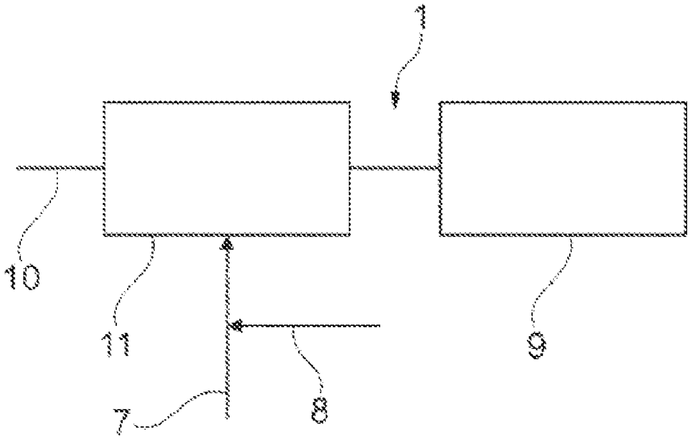
FIG. 4 to 8 show details of a power plant.

Thus, FIG. 4 schematically shows a detail of a power plant 1 having a combustion appliance 9 in which pulverized coal is preferably burned. A boiler system (not shown) is operated by the combustion appliance 9 in order to generate and optionally at least temporarily overheat steam. In order to increase the efficiency of the power plant, combustion air 10, which is to be supplied to the combustion appliance 9, is heated. For this purpose, an air preheater 11 is formed which comprises a heat exchanger by means of which the combustion air 10 is usually heated by means of heat exchange with the flue gas 7 of the power plant 1. According to the present invention, waste gas 8 from the heat engine 4 is mixed with the flue gas 7 upstream of the air preheater 11 at least at times. This brings about an increase in the efficiency of the power plant 1 by increasing the temperature of the combustion air 10 reached in the air preheater 11.

Figure 5:
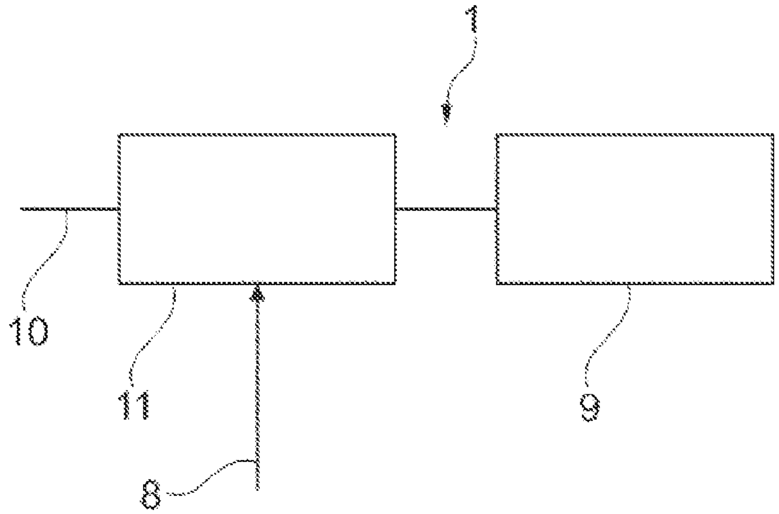

FIG. 5 shows an alternative situation in which the air preheater 11 is operated exclusively using waste gas 8 from the heat engine 4. A mixing device (not shown here) is preferably formed by means of which the waste gas 8 is mixed with the flue gas 7 and the mix ratio between the flue gas 7 and the waste gas 8 can be varied.

Figure 6:
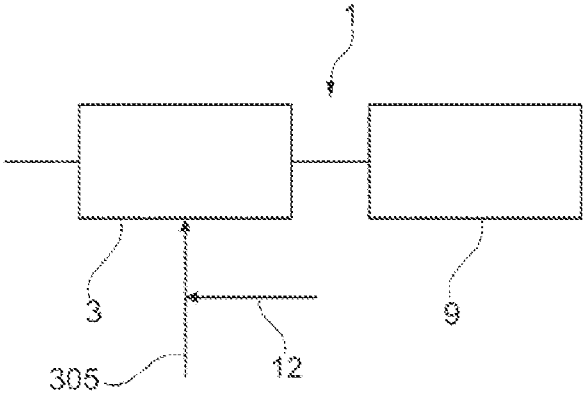

FIG. 6 schematically shows a further section of a power plant 1 which is designed as a coal-fired power plant having a pulverized coal furnace as a combustion appliance 9. A drying installation 3 is formed here, which is designed in principle as shown in FIG. 3, for example. Reference is made to the statements made about this figure. The corresponding dryer 304 is usually operated by steam 305. According to the invention, the corresponding dryer 305 can be operated at least partly by waste heat 12 which is transferred from the waste gas 8 of the heat engine 4 to the steam 305, for example in a heat exchanger (not shown). The waste gas 8, which is slightly cooled in the heat exchanger, can be supplied to the flue gas 7, in particular upstream of an air preheater 7. This increases the efficiency of the entire power plant 1.

Figure 7:
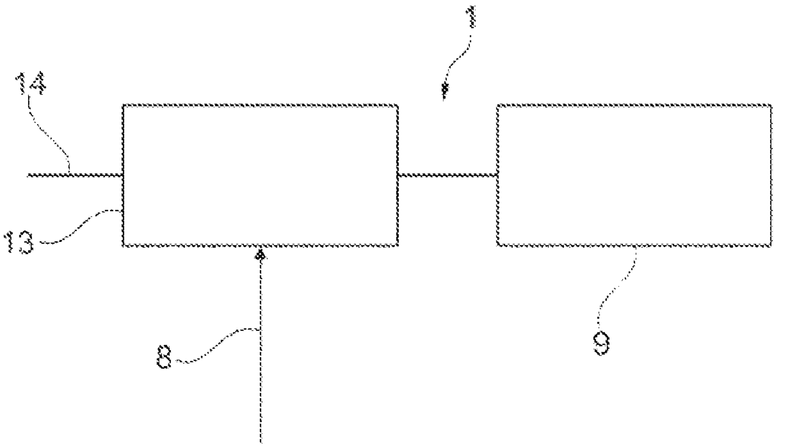

FIG. 7 schematically shows a further detail of a power plant 1 having a combustion appliance 9. Furthermore, a process medium preheater 13 is formed, by means of which a process medium 14, for example water and/or steam, can be heated up and/or overheated before passing through the combustion appliance 9. For this purpose, the waste gas 8 of the heat engine 4 simultaneously flows through the process medium preheater 13, which is designed as a heat exchanger here, such that the waste heat 12 of the waste gas 8 is used to heat the process medium 13. In addition, the waste gas 8, which is thereby cooled, can then be added to the flue gas 7 of the power plant upstream of an air preheater 11. This makes it possible to significantly increase the overall efficiency of the power plant 1.

Figure 8:
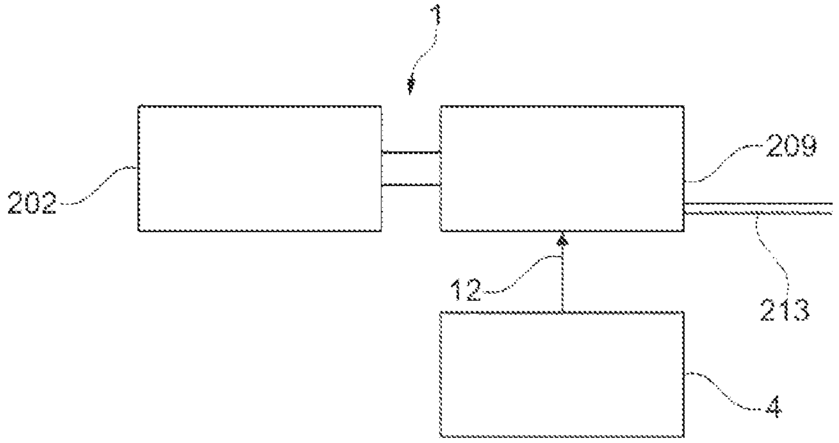

FIG. 8 schematically shows a detail of a carbon dioxide separator 2 of a power plant, such as the carbon dioxide separator 2 shown in FIG. 2. Reference is made to the statements made there. Here, too, a reboiler 209 is formed, by means of which the solvent in the desorber 202 is heated. In addition, the reboiler 209 is also at least partly heated here, at least temporarily, by waste heat 12 from the heat engine 4. For this purpose, a heat exchanger (not shown here) is preferably designed, by means of which at least some of the waste heat 12 is transferred from the waste gas 8 to the steam 213, for example. The waste gas 8 cooled in this way can then, for example, be mixed with the flue gas 7 of the power plant 1 upstream of an air preheater 11 and/or a process medium preheater 13. As a result, the overall efficiency of the power plant 1 can be increased.

Figure 9:
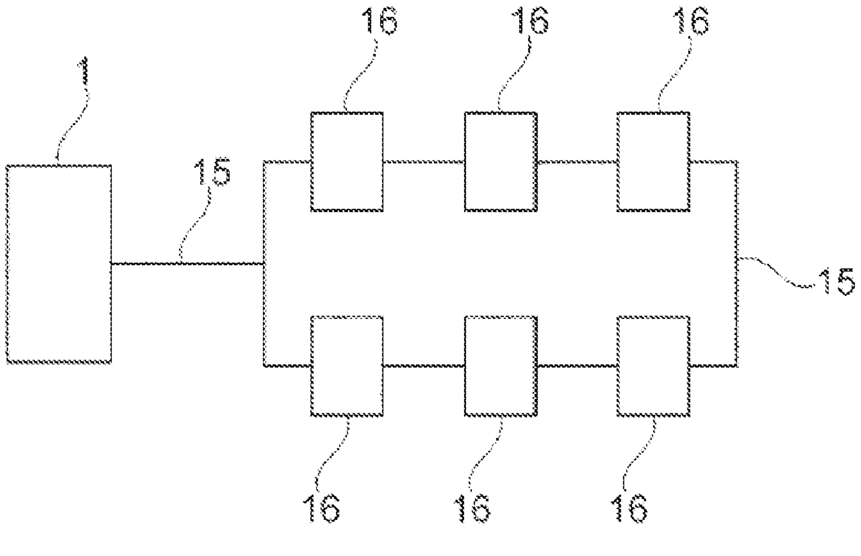
FIG. 9 shows an example of a power grid together with consumers.

FIG. 9 shows, very schematically, a power plant 1 which is connected to a power grid 15 having a plurality of consumers 16. In principle, it is possible, on the basis of the carbon dioxide separated from the flue gas 7, to store energy during times of reduced load on the power grid 15 by a fuel such as DME being synthesized from the carbon dioxide and stored. If the load on the power grid 15 rises above a nominal value, this fuel is combusted in the heat engine 4 in order to generate electricity. If the waste gas 8 is now mixed with the flue gas 7 of the power plant 1 as described above upstream of the carbon dioxide separation system 2, the carbon dioxide of the waste gas 8 of the heat engine 4 can at least partly be separated again from said waste gas such that a carbon dioxide cycle can be created, which reduces carbon dioxide emissions and makes it possible to further increase the overall efficiency of the power plant 1.

Figure 10:
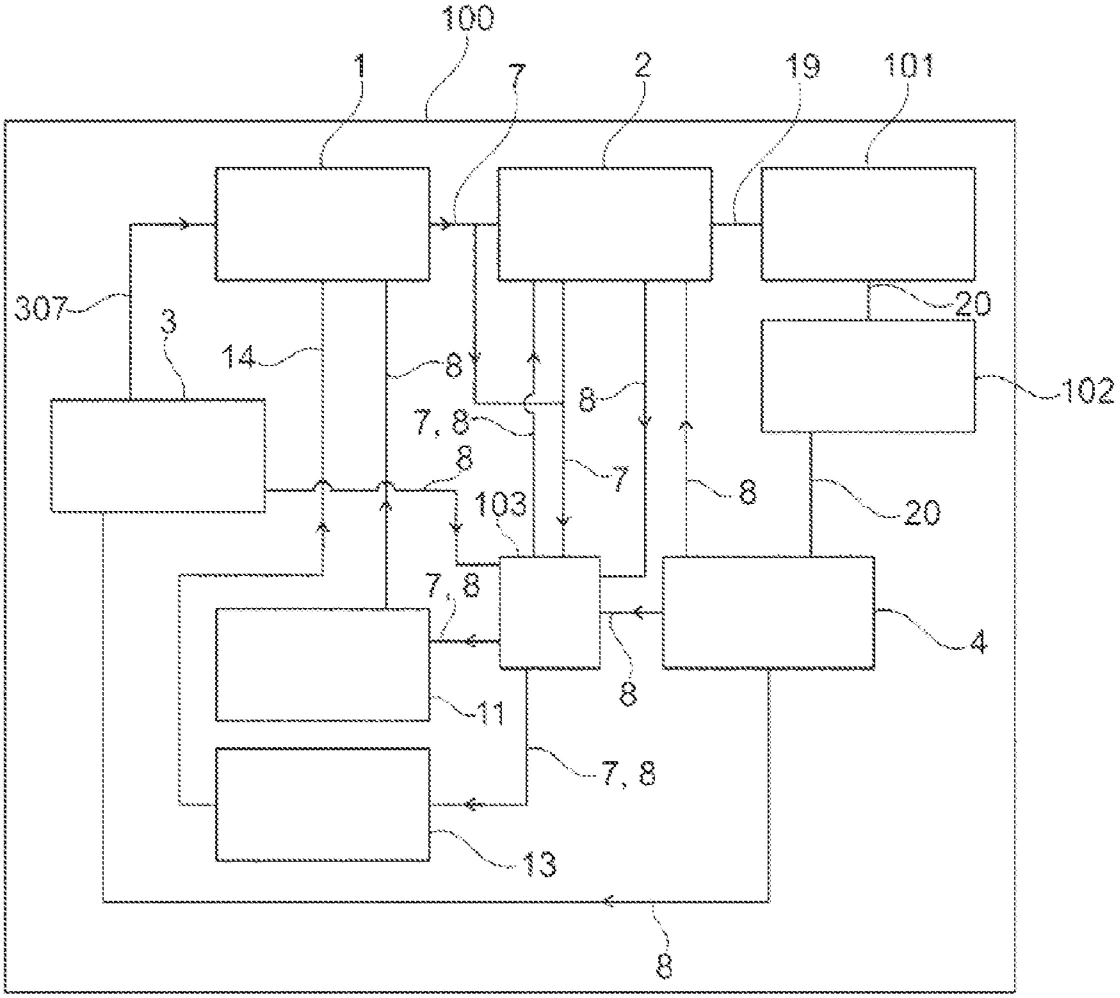
FIG. 10 shows an example of a system comprising a power plant.

FIG. 10 schematically shows a system 100 for operating a power plant 1, in particular proposed according to the method according to the invention, comprising the power plant 1, a carbon dioxide separator 2 and a synthesis installation 101 for synthesizing a fuel from carbon dioxide.

The flue gas 7 is supplied to the carbon dioxide separator 2. The carbon dioxide 19 separated there is supplied to the synthesis installation 101. The fuel 20, for example DME, synthesized in the synthesis installation 101 is stored in a store 102. The system 100 further comprises a heat engine 4 by means of which the fuel 20 can be combusted while generating electrical energy and waste gas 8. The waste gas 8 can be supplied to a mixer 103 in which said waste gas can be mixed with the flue gas 7 directly downstream of the power plant 1 and/or with the flue gas 7 after it has left the carbon dioxide separator 2. The waste gas 8 can also initially serve as a heat source in the carbon dioxide separator 2 and then be conveyed into the mixer 103. The mixer 103 is preferably also operated in such a way that the mixture of flue gas 7 and waste gas 8 is finally supplied to the carbon dioxide separator 2 for separating the carbon dioxide.

The power plant 1 is supplied with dry lignite 307 which is combusted with combustion air 8 from a drying installation 3. The combustion air 8 is heated in an air preheater 11 which is at least partly heated by flue gas 7 and/or waste gas 8 emitted by the mixer 103. Furthermore, a process medium 14 such as water is supplied to the power plant 1 via a process medium preheater 13. In the process medium preheater 13, the process medium 13 is preheated at least partly by flue gas 7 and/or waste gas emitted by the mixer 103. The waste gas 8 can alternatively or additionally be passed through the drying installation 3 before it flows into the mixer 103.

Using the method according to the invention and the system 100 according to the invention, it is possible to increase the overall efficiency of the system 100 and the power plant 1 such that carbon dioxide emissions can be cut effectively. This can be increased if at least a partial carbon dioxide cycle is achieved in which the waste gas 8 is again mixed with the flue gas 7.

LIST OF REFERENCE SIGNS

1 Power plant
2 Carbon dioxide separator
3 Drying installation
4 Heat engine
5 Turbine
6 Washing agent regeneration
7 Flue gas
8 Waste gas
9 Combustion appliance
10 Combustion air
11 Air preheater
12 Waste heat
13 Process medium preheater
14 Process medium
15 Power grid
16 Consumer
17 Uncompressed vapors
18 Compressed vapors
19 Carbon dioxide
20 Fuel
100 System
101 Synthesis installation
102 Store
103 Mixer
201 Absorber
202 Desorber
203 Waste gas
204 First solvent inflow
205 Second solvent outflow
206 Heat exchanger
207 Second solvent outflow
208 Second solvent inflow
209 Reboiler
210 Carbon dioxide flow
211 Cooler
212 Desorber vapors
213 Steam
214 Desorber bottom
301 Crude lignite
302 Crude lignite bunker
303 Mill
304 Dryer
305 Steam
306 Condensate
307 Dry lignite
308 Cooler
309 Mill
310 Vapors
311 Filter
312 Vapor condenser
313 Vapor condensate
314 Vapor compressor

The invention claimed is:

1. A method for operating a power plant for generating electrical energy for delivery to at least one consumer by combustion of a carbonaceous combustible, carbon dioxide being separated from the flue gas of the power plant, the separated carbon dioxide being converted at least in part into a fuel, the method comprising:

combusting the fuel at least temporarily in at least one heat engine so as to form a waste gas having a thermal energy, wherein the heat engine comprises a diesel engine and/or an Otto engine;

generating electrical energy by the at least one heat engine and delivering the electrical energy to the at least one consumer, wherein at least some of the thermal energy of the waste gas formed by the at least one heat engine is used in at least one of the following processes:

a) heating a combustion air of the power plant;
b) heating a process medium of the power plant;
c) drying of the carbonaceous combustible used in the power plant; and
d) separating carbon dioxide from the flue gas of the power plant;

and mixing the waste gas of the heat engine with the flue gas of the power plant after the at least some of the thermal energy of the waste gas is used in at least one of processes a) through d) above;

wherein carbon dioxide is separated from the mixture of the waste gas and the flue gas and converted at least in part into the fuel.

2. The method according to claim 1, wherein the waste gas is supplied to the flue gas of the power plant before the at least some of the thermal energy of the waste gas is used in at least one of the following processes:

a) heating a combustion air of the power plant;
b) heating a process medium of the power plant; and
d) separating carbon dioxide from the flue gas of the power plant.

3. The method according to claim 1, wherein the process medium comprises water.

4. The method according to claim 1, wherein the fuel comprises at least one of the following substances:

methanol;

methane; and dimethyl ether.

5. The method according to claim 1, wherein the at least one consumer of the electrical energy is connected to the power plant via a power grid.

6. The method according to claim 5, wherein the heat engine is operated based on the electrical load in the power grid.

7. The method according to claim 5, wherein the conversion of the carbon dioxide into fuel is operated based on the electrical load in the power grid.

8. The method according to claim 1, wherein the heat engine further comprises a gas turbine.

* * * * *